(12) United States Patent
Blume et al.

(10) Patent No.: US 11,126,395 B2
(45) Date of Patent: Sep. 21, 2021

(54) INTERCOM SYSTEM FOR MULTIPLE USERS

(71) Applicant: SentiAR, Inc., St. Louis, MO (US)

(72) Inventors: Walter Blume, Edwardsville, IL (US); Michael K. Southworth, St. Louis, MO (US)

(73) Assignee: SentiAR, Inc., St. Louis, MO (US)

( * ) Notice: Subject to any disclaimer, the term of this patent is extended or adjusted under 35 U.S.C. 154(b) by 0 days.

(21) Appl. No.: 16/275,099

(22) Filed: Feb. 13, 2019

(65) Prior Publication Data

US 2019/0250879 A1 Aug. 15, 2019

Related U.S. Application Data

(60) Provisional application No. 62/630,185, filed on Feb. 13, 2018.

(51) Int. Cl.

| *G06F 3/16* | (2006.01) |
| *H04W 4/06* | (2009.01) |
| *H04R 1/04* | (2006.01) |
| *G06F 3/147* | (2006.01) |
| *H04R 1/02* | (2006.01) |
| *H04M 9/02* | (2006.01) |
| *G10L 15/26* | (2006.01) |

(52) U.S. Cl.
CPC .............. *G06F 3/165* (2013.01); *G06F 3/147* (2013.01); *G10L 15/26* (2013.01); *H04M 9/02* (2013.01); *H04R 1/028* (2013.01); *H04R 1/04* (2013.01); *H04W 4/06* (2013.01)

(58) Field of Classification Search
CPC ........................................................ G06F 3/165
See application file for complete search history.

(56) References Cited

U.S. PATENT DOCUMENTS

| 9,741,337 B1* | 8/2017 | Shastry ................. G10L 15/187 |
| 2007/0190966 A1 | 8/2007 | Awiszus |
| 2010/0087218 A1 | 4/2010 | Hannosh et al. |
| 2012/0220237 A1* | 8/2012 | Beevers ............... H04B 5/0006 455/41.3 |
| 2013/0289971 A1 | 10/2013 | Parkinson et al. |

(Continued)

OTHER PUBLICATIONS

PCT International Search Report and Written Opinion, PCT Application No. PCT/US2019/017850, dated May 7, 2019, 14 pages.

*Primary Examiner* — Gustavo Polo
(74) *Attorney, Agent, or Firm* — Fenwick & West LLP

(57) ABSTRACT

An intercom system provides audio communication between multiple users wearing head-mounted devices (HMDs). In an embodiment, the intercom system determines a first location of a first HMD of a first user. The intercom system determines a second location of a second HMD of a second user. The intercom system receives audio of the first user from a microphone of the first HMD. The intercom system determines a volume level of the audio at the second location using at least the first location and the second location. The intercom system transmits the audio to the second HMD responsive to determining that the volume level is less than a threshold volume. The intercom system may also selectively transmit audio based on gaze direction of a user. Additionally, the intercom system may generate a transcript of audio input by users.

18 Claims, 3 Drawing Sheets

(56) References Cited

U.S. PATENT DOCUMENTS

| | | | |
|---|---|---|---|
| 2014/0139551 A1* | 5/2014 | McCulloch | G02B 27/017 345/633 |
| 2015/0063599 A1 | 3/2015 | Ring | |
| 2015/0139448 A1 | 5/2015 | Nguyen | |
| 2017/0277257 A1* | 9/2017 | Ota | G06F 3/013 |
| 2018/0285059 A1* | 10/2018 | Zurek | H04L 65/1089 |

* cited by examiner

300

Determine a first location of a first HMD
305

Determine a second location of a second HMD
310

Receive audio from the first HMD
315

Determine a volume level of the audio
320

Transmit the audio to the second HMD responsive to determining that the volume level is less than a threshold volume
325

INTERCOM SYSTEM FOR MULTIPLE USERS

CROSS REFERENCE TO RELATED APPLICATION

This application claims the benefit of priority to U.S. Provisional Application No. 62/630,185, filed on Feb. 13, 2018, which is incorporated herein by reference in its entirety for all purposes.

TECHNICAL FIELD

This disclosure generally relates to an intercom system and to audio communication between multiple users.

BACKGROUND

In medical interventional and surgical suites, there is often a divided space between a "procedure room" and a "control room." Physicians may perform an intervention such as a surgical procedure in the procedure room. In contrast, the control room provides a space for support personnel and equipment that does not need to be sterile. During certain periods in a surgical procedure, some personnel may need to remain at their workstations to perform specific tasks such as interacting with a computer user interface or device controls. At other times of the surgical procedure, the personnel may need to move within a room or between different rooms.

The physical separation or distance of the personnel between two rooms may limit the ability of the personnel to hear spoken or other auditory communication between the two rooms. Additionally, ambient noise within each room, e.g., from supporting medical equipment or ventilation systems, may require that conversations be broadcast loudly across the room when movement of personnel is limited, which can preclude or make it difficult to hold private conversations over sensitive matters.

BRIEF DESCRIPTION OF THE FIGURES

The disclosed embodiments have advantages and features which will be more readily apparent from the detailed description, the appended claims, and the accompanying figures (or drawings). A brief introduction of the figures is below.

SUMMARY

A system provides audio communication between multiple users wearing head-mounted devices (HMDs). In an embodiment, a method includes determining a first location of a first head-mounted device (HMD) of a first user, where the first HMD includes a microphone. The method further includes determining a second location of a second HMD of a second user. The method further includes receiving audio of the first user from the microphone of the first HMD. The method further includes determining a volume level of the audio at the second location using at least the first location and the second location. The method further includes transmitting the audio to the second HMD responsive to determining that the volume level is less than a threshold volume.

In an embodiment, a system includes a first HMD of a first user, where the first HMD includes a microphone. The system further includes a second HMD of a second user. The system further includes a non-transitory computer-readable storage medium storing instructions. When one or more processors execute the instructions, the one or more processors perform steps including determining a first location of the first HMD. The steps further include determining a second location of the second HMD. The steps further include receiving audio of the first user from the microphone of the first HMD. The steps further include determining a volume level of the audio at the second location using at least the first location and the second location. The steps further include transmitting the audio to the second HMD responsive to determining that the volume level is less than a threshold volume.

DETAILED DESCRIPTION

I. Example System Overview

Figure 1:
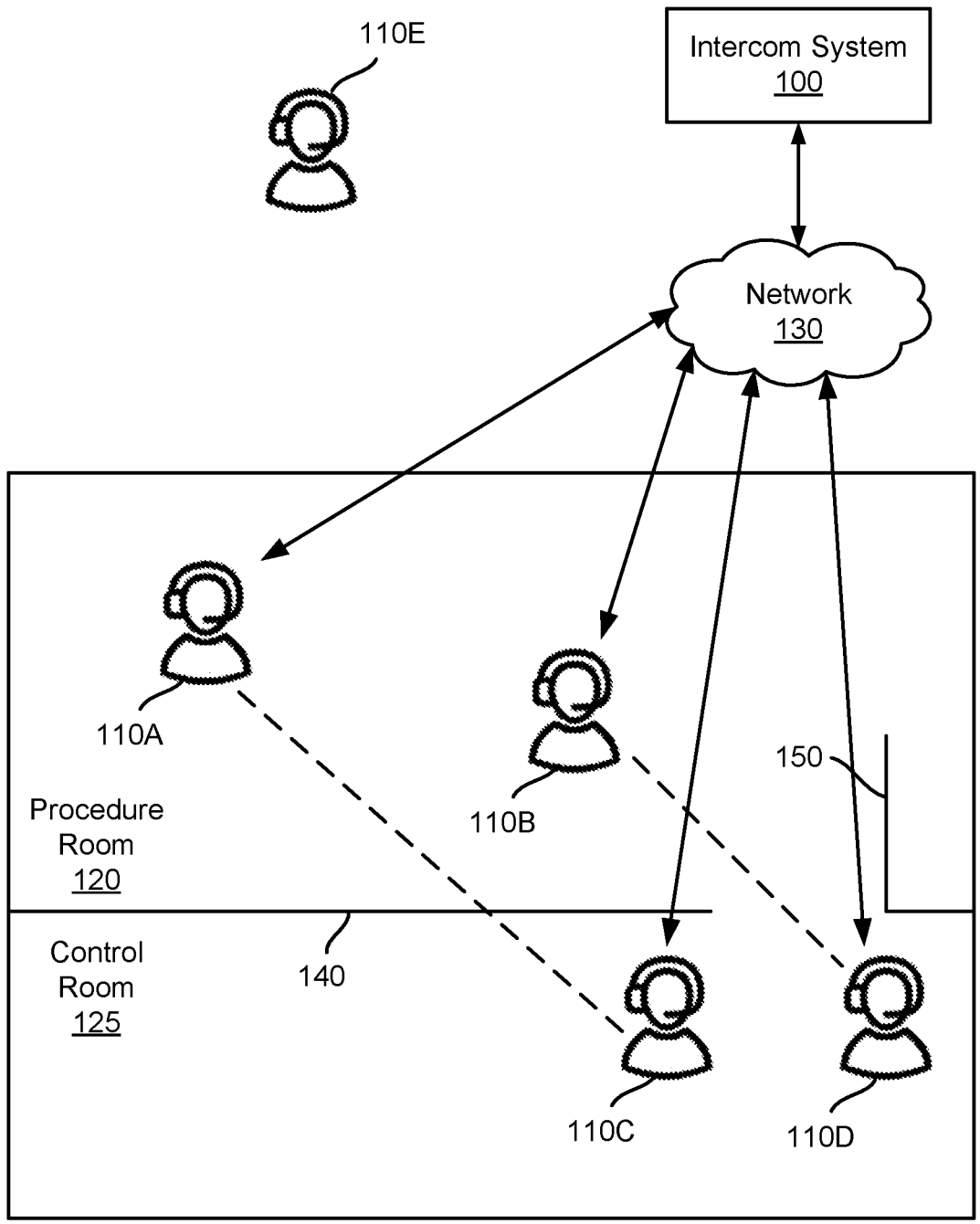
FIG. 1 is a diagram of a system environment for an intercom system according to an embodiment.

FIG. 1 illustrates an example system environment for an intercom system 100 according to an embodiment. The system environment shown in FIG. 1 includes the intercom system 100 and a number of head-mounted devices 110, which are communicatively connected to each other via a network 130 (e.g., the Internet or wireless access point). In the example shown in FIG. 1, the system environment includes HMD 110A, 110B, 110C, 110D, and 110E. Users wearing HMDs 110A and 110B are inside a procedure room 120. Users wearing HMDs 110C and 110D are inside a control room 125. A user wearing HMD 110E is at a location different than the procedure room 120 and control room 125. In other embodiments, different or additional entities can be included in the system environment. For example, there may be any number or types of rooms in which one or more users wearing HMDs 110 are located. The functions performed by the various entities of FIG. 1 may vary in different embodiments.

I. A. Head Mounted Device

A HMD may include one or more of: a sensor to capture information for determining position or orientation of the HMD in physical space (e.g., in two or three dimensions), a microphone to capture audio input of users, a speaker for producing audio output, a wireless means to communicate information (e.g., audio or other sensor data such as position or orientation information) between HMDs or other types of devices, and one or more processors for computing or controlling the audio communicated between the HMDs. In some embodiments, one or more HMDs 110 may be a MICROSOFT HOLOLENS, though various other types of HMDs can also be used including HMDs custom-designed for a medical environment. Example sensors include accelerometers, gyroscopes, inertial measurement units (IMU), depth cameras, and global positioning system (GPS) sensors, ultrasonic sensors, infrared sensors, and proximity sensors, among others.

In some embodiments, a HMD 110 includes an electronic display that displays images to the user in accordance with data received from the intercom system 100, another HMD 110, or another source. Examples of electronic displays include: a liquid crystal display (LCD), an organic light emitting diode (OLED) display, an active-matrix organic light-emitting diode display (AMOLED), a liquid crystal on silicon display (LCOS), some other display, or some combination thereof. In some embodiments, the electronic display may include one or more optical lens, optical waveguides, or optical combiners. In some embodiments, a HMD 110 does not necessarily include an electronic display.

I. B. Audio Transmission Accounting for Distance

The intercom system 100 manages audio communications between two or more HMDs 110. The intercom system 100 may selectively transmit audio between users using one or more types of information, e.g., position or orientation of HMDs 110, or room layout information, further described below in Section I. C. Audio Transmission Accounting for Obstacles.

The intercom system 100 may use location or position information to determine distances between users of HMDs. The intercom system 100 may determine the distances using sensor data received from HMDs 110. As illustrated by the dotted lines in FIG. 1, the distance may be a virtual straight-line path or vector between two HMDs 110. The intercom system 100 may determine a magnitude and angle (e.g., relative to a reference vertical or horizontal line of a room) of the vector. In some embodiments, a HMD 110 uses sensor data to determine position of the HMD 110 relative to other HMDs or relative to a room or reference object. The HMD 110 may provide its position to the intercom system 100. The intercom system 100 may use triangulation or geometry to determine the distances between HMDs 110 using sensor data captured by HMDs 110 or other sensors in a room. In some embodiments, the intercom system 100 may use other types of signals such as WIFI or BLUETOOTH signal strength to determine relative distances between HMDs 110 or relative to a signal transmitter in a room.

Responsive to determining that a first user is located at greater than a threshold distance from a second user, the intercom system 100 may determine to transmit audio of the first user (e.g., captured by a microphone of an HMD 110 of the first user) to a HMD 110 of the second user, e.g., because the second user may be too far to hear the first user without amplification or digital transmission of the audio of the first user. On the other hand, responsive to determining that the first user is at or less than the threshold distance from the second user, the intercom system 100 may determine to not transmit the audio of the first user to the HMD 110 of the second user, e.g., because the second user is close enough to hear the first user without amplification, that is, the spoken communication is audible. The HMD 110 of the second user, responsive to the sensed ambient noise, may determine to transmit the audio of the first user. In particular, the HMD 110 may transmit the audio responsive to determining that the sensed ambient noise exceeds a threshold volume level.

In some embodiments, the intercom system 100 transmits audio to users in a remote location. In the example shown in FIG. 1, a remote user wearing HMD 110E is outside of the procedure room 120 and control room 125 and thus may not be able to hear spoken communication of the users inside the rooms. The intercom system 100 may transmit audio of any of the users inside the rooms to the HMD 110E responsive to determining that the remote user is outside the rooms, e.g., using the threshold distance or GPS information. Responsive to determining that a user is remote, the intercom system 100 may set the location of the user to an arbitrarily distant location relative to the other users.

I. C. Audio Transmission Accounting for Obstacles

In some embodiments, the intercom system 100 uses a model of a layout of a room (or another type of setting) to manage audio communication. The intercom system 100 may generate the model of the room or receive the model from another source. For example, a HMD 110 may provide sensor data indicating locations of obstacles to the intercom system 100. The intercom system 100 may receive and aggregate the sensor data from multiple HMDs 110 in one or more rooms of a building to generate a model of layout of the building. The intercom system 100 may also update a model over time using updated information, e.g., to reflect obstacles that may have moved. In some embodiments, the intercom system 100 receives layout information indicating pre-determined locations and attributes (e.g., type and size) of obstacles. The intercom system 100 may provide the model of the room to HMDs 110 for determining relative position of the HMD 110 within the room. The intercom system 110 may use location information from the HMDs 110 to map locations (e.g., position and/or orientation) of each HMD in the layout of the room.

The intercom system 100 may account for obstacles in a room based on the layout. For instance, the intercom system 100 may determine whether a vector between two HMDs 110 intersects one or more obstacles. Example obstacles include walls, windows, or doors of a room; other users of the intercom system 100; other people or animals; or other objects. For instance, in a medical suite, the objects may include medical equipment, electronics, lighting fixtures, or furniture. In some embodiments, the intercom system 100 may determine a material of an obstacle based on the model of the room. For example, the intercom system 100 determines whether a window is single pane or double pane glass, or a type of mesh. Additionally, the intercom system 100 may determine whether a door or wall is formed of wood, concrete, metal, plastic, fabric, some combination thereof, or another type of material. The intercom system 100 may also determine whether a door or window is open or closed. By accounting for the aforementioned factors in modeling of acoustic paths (e.g., within geometry of a room and present obstacles), the intercom system 100 may determine a level of attenuation of sound between two users wearing HMDs 110. The intercom system 100 may determine volume levels of spoken communication between users by using the level of attenuation in addition to physical distance (e.g., the virtual straight-line vector) between the users.

I. D. Example Use Case: Medical Suite

In some embodiments, the intercom system 100 facilitate audio communication between users in a medical interventional or surgical suite. Referring the example illustrated in FIG. 1, surgeons wearing HMDs 110A and 110B may be performing a surgical procedure on a patient in the procedure room 120. Support personnel wearing HMDs 110C and 110D may be performing tasks in the control room 125 to support the surgeons in the other room. The intercom system 100 improve the capability and ease of the surgeons to communicate with each other and/or with the support personnel. In some embodiments, the intercom system 100 determines to selectively transmit or filter wireless communications between users through the HMDs 110 to reduce or minimize feedback or interference.

For example, the surgeon wearing HMD 110A may not be able to hear the voice of the support person wearing HMD 110C. The intercom system 100 determines that these two users are separated by a distance greater than a threshold distance. Moreover, the intercom system 100 may determine that between the two users is a wall 140, which will attenuate volume of voice from one user to the other. In response, the intercom system 100 may transmit audio input by the support person (e.g., captured by a microphone of HMD 110C) to the HMD 110A of the surgeon. The intercom system 100 or a HMD 110 may reconstruct transmitted electronic sound to reflect spatial location. For example, the HMD 110A plays the transmitted audio from the HMD 110C such that the surgeon perceives the audio as originating from the control room. Thus, the surgeon may be able to distinguish audio originating from users inside the procedure room 120 from audio originating from other users inside the control room 125 or other locations.

Additionally, the intercom system 100 may determine that the surgeon wearing HMD 110B is within a threshold distance from the support person wearing HMD 110D, and thus audio transmission via the HMDs is not necessary. However, responsive to detecting that a door 150 is closed between the two users, the intercom system 100 may determine that the door 150 attenuates the volume of spoken voices of the users such that the voices become difficult to hear or inaudible between the users. In response, the intercom system 100 may transmit audio input by one user to the HMD 110 of the other user.

In one embodiment, the intercom system 100 may determine that the surgeon wearing HMD 110B is within a threshold distance from the support person wearing HMD 110D. However, responsive to detecting that ambient noise is greater than a threshold volume level, the intercom system 100 may determine that the spoken voices of the users become difficult to hear or inaudible between the users. In response, the intercom system 100 may transmit audio input by one user to the HMD 110 of the other user.

In some use cases, a user wearing HMD 110E is supporting the procedure from a remote location. The intercom system 100 may transmit audio input by any of the users wearing HMDs 110A, 110B, 110C, and 110D to the remote user, and vice versa. The intercom system 100 or HMDs may reconstruct audio from the remote user such that the users in the rooms perceive the audio as originating from the above, which serves as an auditory cue that the remote user is not nearby or not inside either room.

I. E. Example Use Case: Transcripts

In some embodiments, the intercom system 100 generates a transcript of a conversation between users. In an example use case, the intercom system 100 determines a first transcription of an audio input by a first user wearing HMD 110A, e.g., detected by a microphone of HMD 110A. The transcription may be a textual and/or numerical representation of the audio. The intercom system 100 may determine the transcription using speech-to-text algorithms or online tools. The intercom system 100 maps the first transcription with a first identifier of the first user. An identifier may be a name, username, email, or number input by a user (e.g., during setup or login to prepare for a conversation session), or assigned to the user by the intercom system 100. In some embodiments, the identifier is associated with the HMD 110 worn by a user, e.g., a serial number of the HMD 110. The intercom system 100 receives additional audio of a second user wearing HMD 110B from a microphone of HMD 110B. The intercom system 100 determines a second transcription of the additional audio of the second user. The intercom system 100 maps the second transcription with a second identifier of the second user. The intercom system 100 generates a transcript of the conversation between the first and second users using the mappings. Since the mappings associate transcriptions to identifiers, readers of the transcript may determine which user spoke a certain communication during the conversation.

Following in the above example, in some embodiments, the intercom system 100 determines a first timestamp of the audio of the first user. The intercom system 100 maps the first timestamp to the first transcription. The intercom system 100 determines a second timestamp of the additional audio of the second user. The intercom system 100 maps the second timestamp to the second transcription. The intercom system 100 generates a transcript of the conversation using the mappings. Since the mapping associate transcriptions to timestamps, readers of the transcript may determine which user was speaking at different times throughout the conversation. In other embodiments, the intercom system 100 may generate transcripts of conversation for any number of users (e.g., three or more users each wearing a HMD 110). Furthermore, the intercom system 100 may generate transcripts that indicate locations of users (e.g., procedure room 120, control room 125, or remote), or to indicate a specific user to whom another user directed communication (e.g., based on gaze direction or gaze cone, which is further described below in Section II. Audio Transmission Based on Gaze Direction).

II. Example Audio Transmission Based on Gaze Direction

Figure 2A:
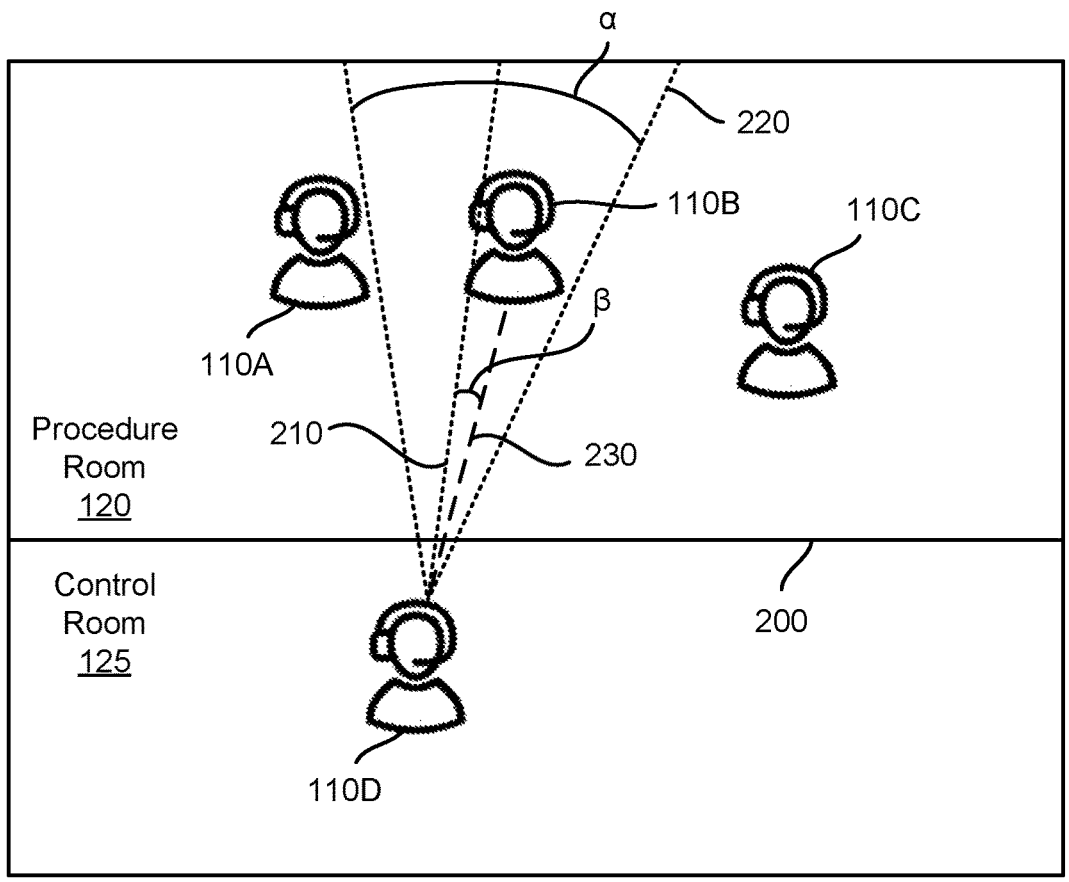
FIG. 2A is a diagram of selective transmission of audio by the intercom system according to an embodiment.

FIG. 2A is a diagram of selective transmission of audio by the intercom system 100 according to an embodiment. The intercom system 100 may selectively transmit audio to specific users based on gaze direction. The intercom system 100 may determine gaze direction of a user at a certain point in time using orientation of the head of the user, orientation of a pupil of the user, or some combination thereof. A HMD 110 or the intercom system 100 may determine an estimate of gaze direction using orientation of the HMD 110 worn by the user, e.g., by processing sensor data of the HMD 110. The orientation may indicate a certain angle in one or more dimensions relative to one or more references axes of the room (e.g., 45 degrees leftwards and 10 degrees upwards).

II. A. Gaze Cone

In some embodiments, the intercom system 100 determines a gaze cone to represent a field of view of a user. The intercom system 100 may determine the gaze cone of the user by projecting (e.g., 2D or 3D) spatial area of a cone having angle α, centered about the gaze direction of the user, and originating from a HMD worn by the user. In embodiments modeling in 3D, the intercom system may use a different (or same) angle when projecting in the horizontal and vertical axes. In some embodiments, the intercom system 100 determines an angle α to include peripheral vision of the user. In other embodiments, the intercom system 100 determines an angle α to focus on a main line of sight of the user, which is smaller angle than expanding to the user's peripheral vision.

The intercom system 100 may determine whether another user is within the gaze cone of the user. In the example shown in FIG. 2A, the intercom system 100 may determine whether the user wearing HMD 110B is within the gaze cone 220 of the user wearing HMD 110D by determining the angle between the gaze direction 210 of the latter user and the straight-line vector 230 between the two users. Representing the gaze direction 210 as A and the vector 230 as B, intercom system 100 determines the angle β between A and B as:

$$\beta = \frac{\cos^{-1} A \cdot B}{AB}$$

The intercom system 100 determines that user wearing HMD 110B is within the gaze cone by determining that $\beta < \alpha/2$. Applying the calculations to locations of other users, the intercom system 100 may determine that the users wearing HMDs 110A and 110C are not located within the gaze cone 220. Responsive to these determinations, the intercom system 100 may transmit audio from the user wearing HMD 110D to the user wearing HMD 110B, but not to transmit to the users wearing HMDs 110A and 110C. Thus, the user wearing HMD 110D may selectively direct the user's communication by facing the intended audience of the communication. This may be advantageous because users can carry out private conversations (e.g., about sensitive information) with specific users, even if other users may be nearby. Gaze direction based communication may also be advantageous because users can avoid disturbing certain users to whom they do not need to communicate in a crowded setting with multiple users.

In some embodiments, the intercom system 100 may determine whether to selectively transmit audio based on gaze cone using a user input. For instance, a user may provide a user input via a HMD 110 to activate a gaze cone transmission mode. When the gaze cone transmission mode is not activated, the intercom system 100 may determine to transmit audio by accounting for other factors such as distance or obstacles.

II. B. User Interface Display

Figure 2B:
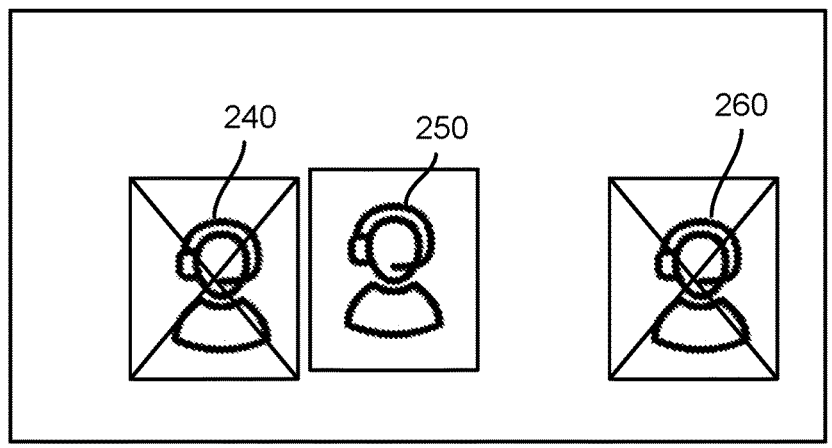
FIG. 2B is a diagram of an example user interface of the intercom system according to an embodiment.

FIG. 2B is a diagram of an example user interface of the intercom system 100 according to an embodiment. The user interface may be displayed by an electronic display of a HMD 110. The user interface may include a video stream showing users or graphical representations of users, e.g., in a virtual reality environment. In an augmented reality environment, the user interface may include visual indicators or graphics overlaying a real-life field of view of a user.

Following in the example of FIG. 2A, the user interface shown in FIG. 2B may be displayed by the HMD 110D to the user wearing HMD 110D. The intercom system 100 may generate the graphical representations 240, 250, and 260, of the users wearing HMDs 110A, 110B, and 110C, respectively, at the approximate positions in space of those users in the real world. Thus, the user wearing HMD 110D may perceive location of the other three users even though a physical barrier such as the wall 200 obstructs the line of sight of the user in the control room 125 from looking into the procedure room 125.

In some embodiments, the intercom system 100 provides a visual indicator to indicate a user that will selectively receive audio. Additionally or alternatively, the intercom system 100 may provide a visual indicator to indicate a user that will not receive audio. In the example shown in FIG. 2B, the graphic of a box overlaid on the graphical representation 250 indicates that the intercom system 100 will transmit audio to the user wearing HMD 110B (shown in FIG. 2A). The graphics of boxes with "X" marks 250 and 260 overlaid on the graphical representations 240 and 260 indicates that the intercom system 100 will not transmit audio to the users wearing HMDs 110A and 110C (shown in FIG. 2A). In other embodiments, the visual indicators may be represented by other types of graphics such as text, arrows, colors, patterns, or other shapes.

III. Example Process Flow

Figure 3:
FIG. 3 is a flowchart of a process for transmitting audio by the intercom system according to an embodiment.
Figure 3:
Figure 3:
Figure 3:

FIG. 3 is a flowchart of a process 300 for transmitting audio by the intercom system 100 according to an embodiment. The process 300 may include different or additional steps than those described in conjunction with FIG. 3 in some embodiments or perform steps in different orders than the order described in conjunction with FIG. 3.

The intercom system 100 determines 305 a first location of a first HMD of a first user, where the first HMD includes a microphone. The intercom system 100 determines 310 a second location of a second HMD of a second user. The intercom system 100 receives 315 audio of the first user from the microphone of the first HMD.

The intercom system 100 determines 320 a volume level of the audio at the second location using at least the first location and the second location. The intercom system 100 may determine the volume level by determining a (e.g., straight-line) distance between the first location and the second location. Additionally, the intercom system 100 may determine the volume level by determining that an obstacle is present between the first HMD and the second HMD. For example, the intercom system 100 determines that the first user is located in a first room and the second user is located in a second room different than the first room. The intercom system 100 determines that a wall between the first room and the second room intersects a line of sight between the first user and the second user.

In some embodiments, the intercom system 100 generates a physics-based acoustic transmission model using as inputs one or more of: a model of the room layout (e.g., indicating presence and/or types of one or more obstacles), the first location (e.g., of the sound producer), the second location (e.g., of the listener), a volume of the audio detected by the microphone, ambient noise level, or gaze direction of the first user. The intercom system 100 may use the acoustic transmission model to estimate the volume level of the audio at the second location, that is, the volume level or quality of the spoken voice of the first user without digital transmission or amplification. The intercom system 100 transmits 325 the audio to the second HMD responsive to determining that the volume level is less than a threshold volume.

In some embodiments, the intercom system 100 may enable or disable selective transmission using a volume level detected by a microphone of a HMD 110. For instance, responsive to determining that the spoken volume level exceeds a threshold volume, the intercom system 100 transmits the spoken communication to some or all users in a conversation or location, e.g., the procedure room 120 or control room 125 or shown in FIG. 1. The intercom system 100 may infer that the speaking user intends for all nearby users (e.g., within a threshold radius) to hear the spoken communication. The intercom system 100 may enable this "mass broadcasting" mode responsive to receiving a user input from a user via a HMD 110.

IV. Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system comprising:
    a first head-mounted device (HMD) of a first user, the first HMD including a first microphone;
    a second HMD of a second user, the second HMD including a second microphone; and
    a non-transitory computer-readable storage medium storing instructions, the instructions when executed by one or more processors cause the one or more processors to perform steps including:
        determining a first location of the first HMD;
        determining a second location of the second HMD;
        receiving audio of the first user from the first microphone of the first HMD;
        determining a volume level of the audio at the second location using at least the first location and the second location;
        determining a gaze direction of the first user using sensor data captured by the first HMD;
        determining a field of view of the first user using the gaze direction;
        responsive to determining that the volume level is less than a threshold volume and determining that the second user is within the field of view of the first user, transmitting the audio to the second HMD;
        determining a first transcription of the audio of the first user;
        mapping the first transcription to a first timestamp and a first identifier of the first HMD;
        receiving additional audio of the second user from the second microphone of the second HMD;
        determining a second transcription of the additional audio of the second user; and
        mapping the second transcription to a second timestamp and a second identifier of the second HMD, wherein the first transcription and the second transcription are associated with a conversation between the first user and the second user.

2. The system of claim 1, wherein determining the volume level of the audio comprises:
    determining a distance between the first location and the second location.

3. The system of claim 1, wherein determining the volume level of the audio comprises:
    determining that an obstacle is present between the first HMD and the second HMD.

4. The system of claim 3, wherein determining that the obstacle is present comprises:
    determining that the first user is located in a first room;
    determining that the first user is located in a second room different than the first room; and
    determining that a wall between the first room and the second room intersects a line of sight of between the first user and the second user.

5. The system of claim 1, wherein the non-transitory computer-readable storage medium stores further instructions that when executed by the one or more processors cause the one or more processors to perform steps including:
    responsive to determining that a third user is outside the field of view of the first user, determining not to transmit the audio to a third HMD of the third user.

6. The system of claim 1, wherein the non-transitory computer-readable storage medium stores further instructions that when executed by the one or more processors cause the one or more processors to perform steps including:
    providing a graphic for presentation on a display of the first HMD, the graphic indicating that the audio is being transmitted to the second HMD.

7. A method comprising:
    determining a first location of a first head-mounted device (HMD) of a first user, the first HMD including a first microphone;
    determining a second location of a second HMD of a second user, the second HMD including a second microphone;
    receiving audio of the first user from the first microphone of the first HMD;
    determining a volume level of the audio at the second location using at least the first location and the second location;

determining a gaze direction of the first user using sensor data captured by the first HMD;

determining a field of view of the first user using the gaze direction;

responsive to determining that the volume level is less than a threshold volume and determining that the second user is within the field of view of the first user, transmitting the audio to the second HMD;

determining a first transcription of the audio of the first user;

mapping the first transcription to a first timestamp and a first identifier of the first HMD;

receiving additional audio of the second user from the second microphone of the second HMD;

determining a second transcription of the additional audio of the second user; and mapping the second transcription to a second timestamp and a second identifier of the second HMD, wherein the first transcription and the second transcription are associated with a conversation between the first user and the second user.

8. The method of claim 7, wherein determining the volume level of the audio comprises:

determining a distance between the first location and the second location.

9. The method of claim 7, wherein determining the volume level of the audio comprises:

determining that an obstacle is present between the first HMD and the second HMD.

10. The method of claim 9, wherein determining that the obstacle is present comprises:

determining that the first user is located in a first room;

determining that the first user is located in a second room different than the first room; and determining that a wall between the first room and the second room intersects a line of sight of between the first user and the second user.

11. The method of claim 7, further comprising:

responsive to determining that a third user is outside the field of view of the first user, determining not to transmit the audio to a third HMD of the third user.

12. The method of claim 7, further comprising:

providing a graphic for presentation on a display of the first HMD, the graphic indicating that the audio is being transmitted to the second HMD.

13. A non-transitory computer-readable storage medium storing instructions, the instructions when executed by one or more processors cause the one or more processors to perform steps including:

determining a first location of a first head-mounted device (HMD) of a first user, the first HMD including a first microphone;

determining a second location of a second HMD of a second user, the second HMD including a second microphone;

receiving audio of the first user from the first microphone of the first HMD;

determining a volume level of the audio at the second location using at least the first location and the second location;

determining a gaze direction of the first user using sensor data captured by the first HMD;

determining a field of view of the first user using the gaze direction;

responsive to determining that the volume level is less than a threshold volume and determining that the second user is within the field of view of the first user, transmitting the audio to the second HMD;

determining a first transcription of the audio of the first user;

mapping the first transcription to a first timestamp and a first identifier of the first HMD;

receiving additional audio of the second user from the second microphone of the second HMD;

determining a second transcription of the additional audio of the second user; and mapping the second transcription to a second timestamp and a second identifier of the second HMD, wherein the first transcription and the second transcription are associated with a conversation between the first user and the second user.

14. The non-transitory computer-readable storage medium of claim 13, wherein the conversation between the first user and the second user is associated with a surgical procedure.

15. The system of claim 1, wherein the conversation between the first user and the second user is associated with a surgical procedure.

16. The method of claim 7, wherein the conversation between the first user and the second user is associated with a surgical procedure.

17. The method of claim 16, further comprising:

determining that the first user and the second user are located in a procedure room for the surgical procedure based on the first location and the second location.

18. The method of claim 16, further comprising:

determining that the first user is located in a procedure room for the surgical procedure based on the first location; and determining that the second user is located in a room different than the procedure room based on the second location.

* * * * *

UNITED STATES PATENT AND TRADEMARK OFFICE
CERTIFICATE OF CORRECTION

PATENT NO. : 11,126,395 B2
APPLICATION NO. : 16/275099
DATED : September 21, 2021
INVENTOR(S) : Blume et al.

Page 1 of 1

It is certified that error appears in the above-identified patent and that said Letters Patent is hereby corrected as shown below:

In the Claims

Claim 4, Column 10, Line 37, delete "first" and insert -- second --.

Claim 10, Column 11, Line 33, delete "first" and insert -- second --.

Signed and Sealed this
Second Day of August, 2022

Katherine Kelly Vidal
*Director of the United States Patent and Trademark Office*